Nov. 17, 1970  M. I. GLASS ET AL  3,540,132
AUDIO VISUAL EDUCATIONAL TOY
Filed Oct. 25, 1968  3 Sheets-Sheet 1
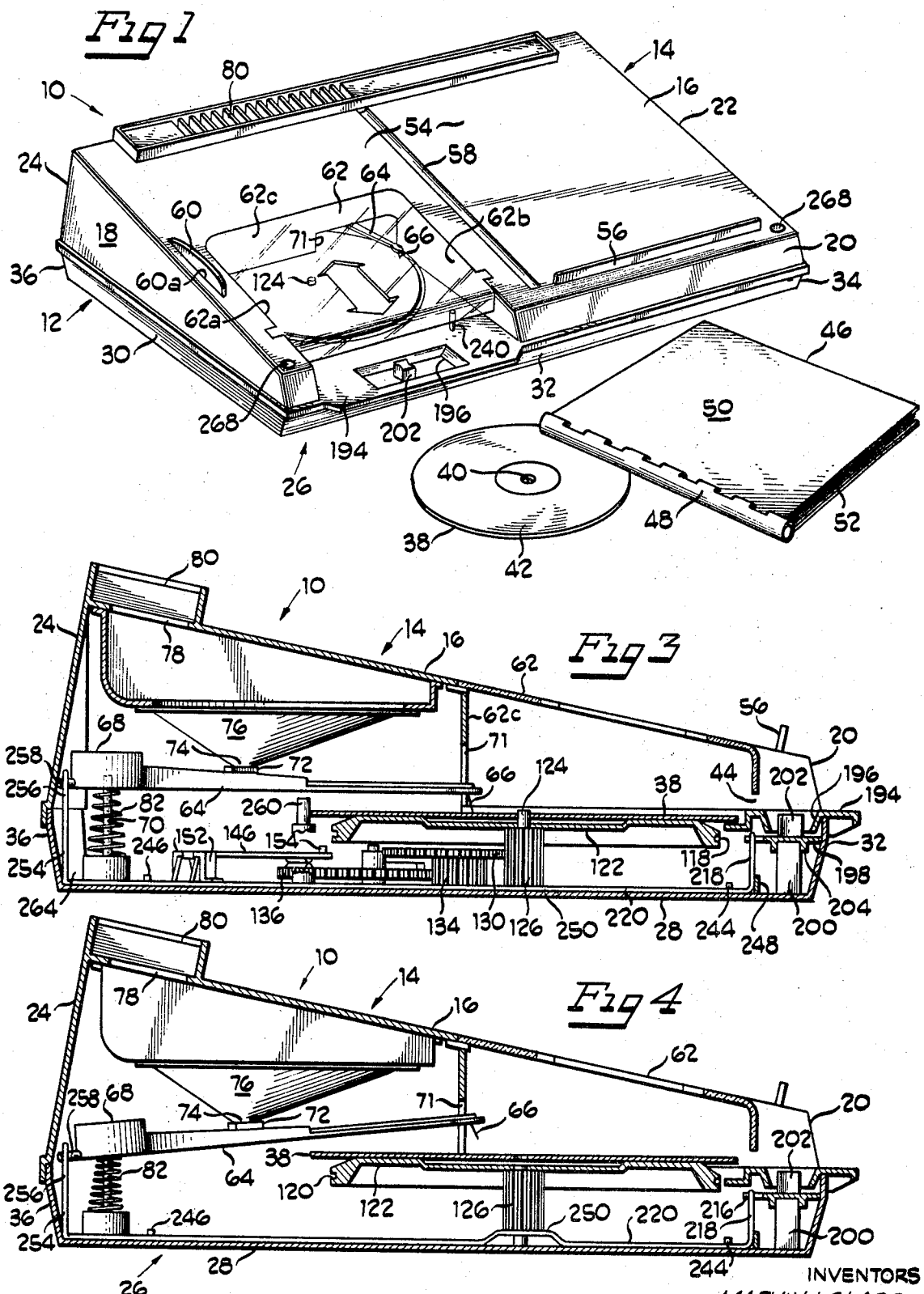
INVENTORS
MARVIN I. GLASS
GUNARS LICITIS
GORDON A. BARLOW
BY Hofgren, Wegner, Allen,
Stellman & McCord
ATTORNEYS Nov. 17, 1970  M. I. GLASS ET AL  3,540,132
AUDIO VISUAL EDUCATIONAL TOY
Filed Oct. 25, 1968  3 Sheets-Sheet 2
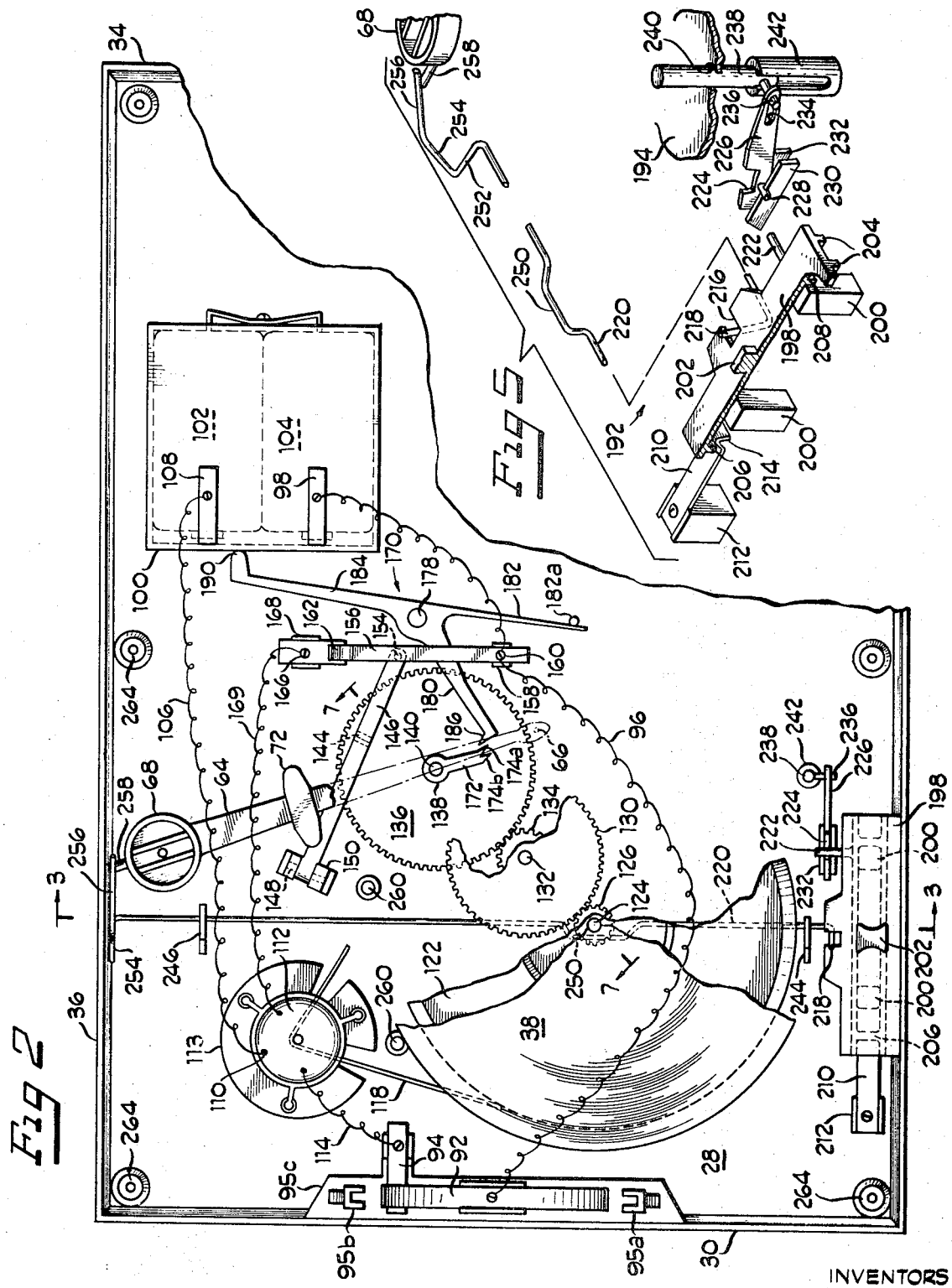
INVENTORS
MARVIN I. GLASS
GUNARS LICITIS
GORDON A. BARLOW
BY Hofgren, Wegner, Allen,
Stellman & McCord
ATTORNEYS Nov. 17, 1970    M. I. GLASS ET AL    3,540,132
AUDIO VISUAL EDUCATIONAL TOY
Filed Oct. 25, 1968    3 Sheets-Sheet 3
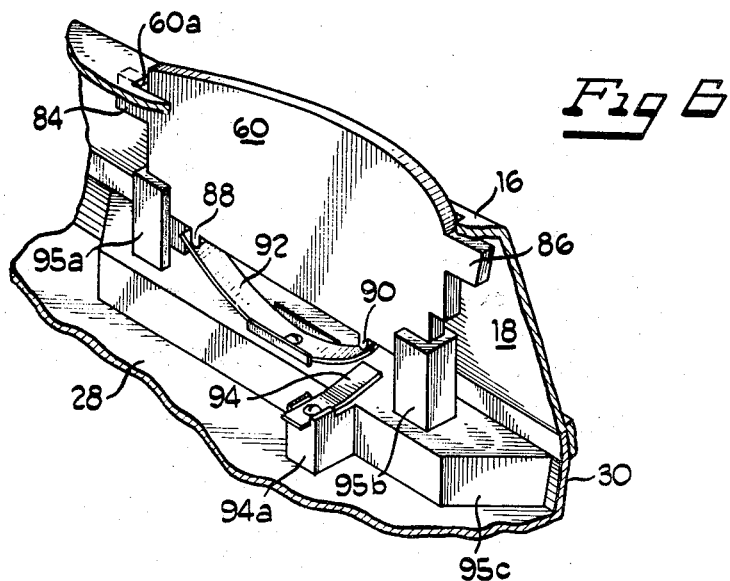
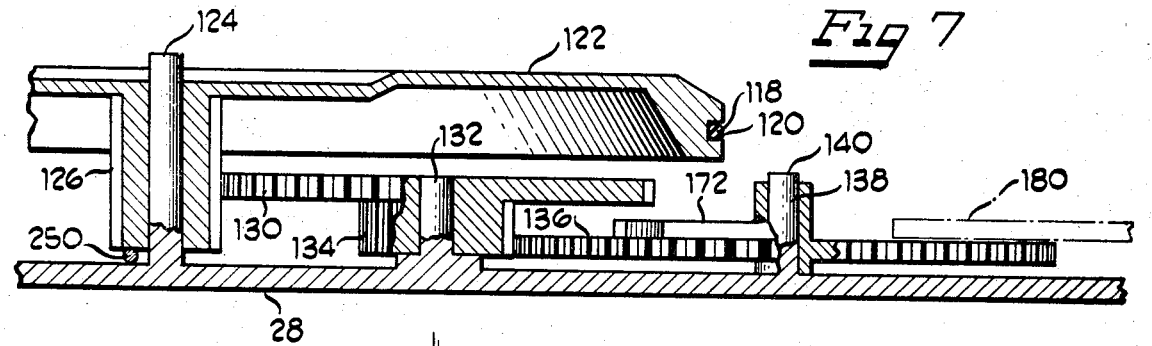
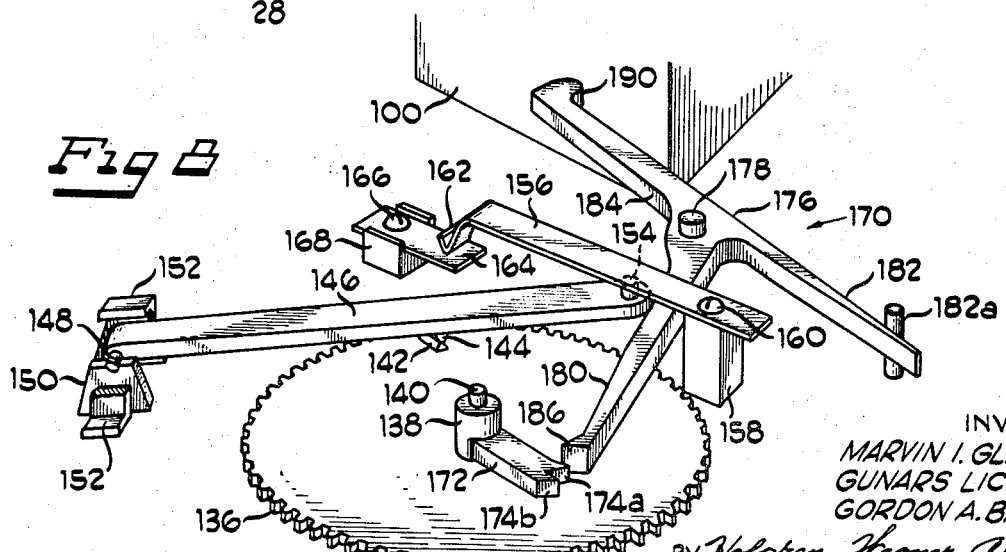
INVENTORS
MARVIN I. GLASS
GUNARS LICITIS
GORDON A. BARLOW
BY Hofgren, Wegner, Allen,
Stellman & McCord
ATTORNEYS 3,540,132
AUDIO VISUAL EDUCATIONAL TOY
Marvin I. Glass, Chicago, Gunars Licitis, Lombard, and Gordon A. Barlow, Chicago, Ill., assignors to Marvin Glass & Associates, a partnership
Filed Oct. 25, 1968, Ser. No. 770,672
Int. Cl. G09b 1/06
U.S. Cl. 35—8                                                                     13 Claims

ABSTRACT OF THE DISCLOSURE

A children's audio visual entertainment device of the type including a book and a phonograph mechanism with phonograph records bearing message portions corresponding to the story or message of the book in sequential order to the pages of the book, characterized in that the phonograph includes a switch mechanism on the book supporting surface for actuating the record mechanism for a cycle of operation thereof, the cycle corresponding to a limited portion of the book. Subsequent actuation of the switch occurring as the pages of the book are advanced reinitiate actuation of the record mechanism to thereby play a subsequent portion of the record corresponding to a subsequent portion of the pages of the book.

BACKGROUND OF THE INVENTION

Field of the invention

This invention relates to a children's audio visual entertainment device, sometimes known as a "talking book."

Brief description of the prior art

The pertinent prior art presently known includes the U.S. Pats. to Kantrowitz 3,086,297 and Clawson 3,273,-894. Both of these patents generally disclose a casing with a phonograph mechanism within the casing and book-like portions associated with the casing. A record in the casing bears a message generally corresponding to the book-like portion which is associated with the casing. In each of these structures, an independent lever mechanism must be set to position the phonograph needle in a certain position in the record corresponding to a certain portion of the book to which the record relates. Sequential advancement of the pages of the book will not accomplish this result and a desire for a talking book mechanism which will operate in such a fashion has arisen in the art.

SUMMARY OF THE INVENTION

This invention is directed, in brief, to the provision of a children's audio visual entertainment device of the talking book type wherein phonograph mechanism may be sequentially activated by sequential advancement of the pages of a book structure positioned on a book supporting area of the casing in which the phonograph mechanism is housed.

The best mode currently contemplated for carrying out the invention includes the provision of switch mechanism positioned to underlie one edge of a book with the phonograph record and turntable drive mechanism constructed and arranged to drive through one cycle responsive to actuation of the switch, the cycle corresponding to two facing pages of the book. As the book page is turned, the user may strike the switch underlying the pages to activate the phonograph mechanism to play through another cycle corresponding to the subsequent two facing pages of the book and so on. At the termination of the record and the book, the record needle is re-positioned at the beginning of the record to correspond to the beginning of the book.

BRIEF DESCRIPTION OF THE DRAWINGS

FIG. 1 is a perspective view of the audio visual entertainment device or talking book of this invention;

FIG. 2 is an enlarged fragmentary view, partially broken away in section, of the lower portion of the housing of the entertainment device of this invention;

FIG. 3 is a section view taken generally along the lines 3—3 of FIG. 2 showing the phonograph turntable and tone arm in an operative position;

FIG. 4 is a section view similar to FIG. 3 showing the phonograph turntable in a raised position and the tone arm in a position for resetting;

FIG. 5 is a fragmentary broken perspective view of a portion of the tone arm resetting mechanism;

FIG. 6 is a fragmentary enlarged view of a portion of the record actuating switch mechanism;

FIG. 7 is a fragmentary enlarged sectional view of the turntable and gear mechanism taken generally along the lines 7—7 of FIG. 2; and FIG. 8 is a fragmentary perspective view of a portion of the switch release arm and page turning audio signal structure.

While this invention is susceptible of embodiment in many different forms, there is shown in the drawings and will herein be described in detail, a specific embodiment therefor, with the understanding that the present disclosure is to be considered as an exemplification of the principles of the invention and is not intended to limit the invention to the embodiment illustrated.

DESCRIPTION OF THE PREFERRED EMBODIMENT

The audio visual entertainment device or talking book 10 of this invention includes a housing or casing 12 comprised of an upper portion 14 having a top 16 and depending sides 18, 20, 22 and 24; and a bottom portion or lower portion 26 having a base or bottom 28 and upstanding side walls 30, 32, 34 and 36. Preferably, the housing or casing 12 is made of a suitable rigid material, such as a rigid plastic or the like to provide sufficient support for the several components of the structure as well as to withstand the rigors of use. It is intended that a phonograph record 38 of the well known type having a center spindle receiving opening 40 and a message bearing portion 42 is to be inserted into the interior of housing 12 through a slot 44 in wall 20 to be positioned for playing. It is further intended that a book 46 is to be utilized with the device 10 of this invention, the book having the usual backbone 48, cover 50 and interior pages 52.

The upper portion 14 of housing 12 has, in the top 16 thereof, a hook support area 54 including an upstanding ledge 56 adjacent side 20 and a backbone groove or depression 58 extending generally medially of top 16 between sides 20 and 24 for generally nestably receiving the backbone 48 of book 46.

An actuating switch 60 extends through an opening 60a in top 16 adjacent side wall 18 and is spaced from the depression 58 a distance generally corresponding to, but slightly less than, the width of the cover 50 of book 46, so that when the book is positioned on the book supporting area 54 with the backbone 48 in depression 58 and the book is spread open to a reading position, cover 50 will overlie switch 60. A transparent or translucent window 62 is positioned in the book support area 54 between switch 60 and backbone depression 58 to observe the placement of record 38 in operating position after inserting the same through slot 44. Window 62 overlies a rectangular cut out portion in top 16, bounded by depending surfaces 62a, 62b and 62c.

It is intended that the device 10 will be utilized to play messages from the phonograph record 38 corresponding to reading material or illustrations on the pages 52 of book 46. This will be accomplished by depression of switch 60 to actuate appropriate circuitry, to be described later, which will cause operation of suitable mechanism, also to be described later, to rotate the record 38.

Tone arm 64 has a stylus or needle 66 normally in engagement with the message portion 42 of record 38. Arm 64 is pivoted at one end 68 to post 70 upstanding from the bottom 28 of base 26 and projects through slot 71 in surface 62c. An intermediate portion or platform portion 72 of the arm engages an apex 74 of diaphragm or speaker 76 so that rotation of record 38 will cause the transmittal of sound out through openings 78 and louvers 80 in the top 16 of upper portion 14 of housing 12 adjacent the side 24. Tone arm 64 is biased by spring 82 about post 70 to maintain portions 72 in engagement with apex 74 of speaker 76.

Due to the overlying relationship of cover 50 with respect to switch 60, it can be seen that each successive turning of the pages 52 will at least remind the user to depress the switch 60 by pressing on the book pages if not, in fact, causing such depression by the mere page turning manipulation itself. This will cause successive actuation of the phonograph mechanism so that the next successive message on the record 38 will be transmitted out of the speaker 76 and in this fashion, the record messages will sequentially correspond to the page sequence of the book so that the user of the device 10 may "read along" with the "talking book."

Turning now to the details of the circuitry and mechanical structure for operating the phonograph mechanism, switch 60 is an elongate rigid member of a stiff plastic or similar material and includes two outwardly projecting ears 84 and 86 at opposite ends thereof below the openings 60a in the top of the housing. The bottom of the switch has two depending nibs 88 and 90 which engage opposite ends of leaf spring 92, that normally urges switch 60 upwardly through opening 60a. One end of leaf spring 92 overlies switch contact 94 mounted on post 94a upstanding from base 28. An opposed pair of inwardly slotted mutually facing posts 95a and 95b are mounted on step 95c situated on base 28 and slidably receive opposite sides of switch 60 to mount the same for vertical to and fro movement. Ears 84 and 86 bear against the underside of top 16 and hold switch 60 in casing 12 against the bias of spring 92 in a retracted or inoperative position. Thus, in operation, suitable pressure on switch 60 will depress the same and move it to an extended, operative position where leaf spring 92 engages contact 94 and release of such pressure automatically returns switch 60 to the retracted inoperative position. A lead wire 96 extends from leaf spring 92 to post 98 of battery casing 100 which holds batteries 102 or 104 to provide a source of power for actuating the circuitry of the mechanism.

A wire 106 leads from post 108 to a terminal 110 on motor 112. Motor 112 is mounted in mounting arrangement 113. To complete the circuit, a wire 114 leads from motor 12 to contact 94. Therefore, when the switch 60 is depressed there is a surge of current which runs from the batteries 102, 104 to the motor 112 and causes the motor to rotate shaft 116 and drive belt 118 to drive the several components of the phonograph mechanism through a small increment of travel.

Belt 118 is wound about a peripheral groove 120 in generally disc-like turntable 122. Pin 124 extends upwardly from the bottom 28 of the lower housing. Turntable 122 includes a depending central pinion sleeve 126 slidably telescoped over upstanding pin 124. Pin 124 is of greater axial extent than sleeve 126 and normally projects aboves turntable 122 for impaling records such as through the central opening 40 thereof.

Pinion 126 engages gear 130 rotatably mounted on stub 132 which extends upwardly from base 28 of bottom 14. Gear 130 has a depending sleeve-like pinion 134 that engages gear 136. Gear 136 is provided with a central sleeve-like hub 138 by means of which the gear is impaled on stub 140 which also projects upwardly from the base 28. Thus, when the circuit from switch 60 to motor 112 is activated, all of the pinions and gears 126, 130, 134 and 136 are displaced through a small increment of movement until contact between spring 92 and contact 94 is terminated.

As best seen in FIG. 8, and also seen in FIG. 2, the top gear 136 has upstanding cam 142 which is radially positioned to engage cam 144 on the underside of arm 146. Arm 146 is pivoted on a pin 148 that is journaled in bearings 150 and secured therein by S-shaped bracket 152. The opposite end of arm 146 has an upstanding finger 154 which abuts and underlies spring 156.

Spring 156 is fixed to stub 158 projecting upwardly from base 28 by suitable means such as screw 160. The opposite end of spring 156 has a downwardly offset portion 162 normally in engagement with switch leaf 164 that is fixed, by means of screw 166, to support 168 which also projects upwardly from base 28. When gear 136 is displaced so that cam 142 abuts cam 144, finger 154 on arm 146 raises spring 156 to move end 162 of spring 156 out of contact with switch leaf 164.

Wire 169 runs from switch leaf 164 to the motor 112 and wire 96 which runs from switch 60 to the post 98 and the battery casing 100 also is connected, in series, with the switch spring 156. Switch spring 156 and switch leaf 164 provide a normally closed circuit which is opened when the cams 142 and 144 engage so that the spring is lifted out of contact with the switch leaf 164. The incremental movement imparted to the system by the momentary engagement of switch 60 displaces the gear 136 through a sufficient arcuate increment to move the two cams 142 and 144 out of engagement with each other so that the switch leaf 164 will be engaged by spring 156 and the circuit will be closed therethrough. Thus, the system will continue to operate by reason of the power being fed to the motor from the circuit established through the normally closed circuit of spring 156 and leaf 164. The system will continue to operate for one cycle until such time as the cams 142 and 144 again come in contact, which, through the suitable gearing ratios with respect to the record diameter and the like, is intended to be for a period of time which would comprise one revolution of gear 136 or sufficient revolutions of the turntable 122 so that one complete message on the phonograph record 38 would be completed. It is intended that such one completed message would correspond to the reading material or message printed on two facing pages 52 of book 46.

Means 170 are provided in association with the gear mechanism for producing an audible signal for reminding the user to turn the pages of the book and reset the switch 60 to reactivate the phonograph mechanism. Included in this means is an arm 172 which is connected with, and projects radially outwardly from, the hub 138 of gear 136. The free end of this arm 172 is provided with two generally triangular shaped projections 174a and 174b.

A hammer member 176 is pivoted at 178 to the base 28 of the housing. Hammer member 176 includes three diverging legs 180, 182 and 184. Leg 180 has a generally triangular shaped projection 186 positioned in the path of travel of the projections 174a and 174b of arm 172. Leg 182 is positioned adjacent a stop pin 182a at the free end of the leg. Leg 184 has a projection 190 which normally rests adjacent battery casing 100.

As gear 136 rotates, the arm 172 on hub 138 is carried through an arcuate path of travel with gear 136. When the cam 142 is closely adjacent to the cam 144, the two projections 174a and 174b strike the projection 186 on arm 180 of hammer member 176 and cause slight displacement thereof. This displacement is translated as intermittent movement in the leg 184 causing the projection 190 to repeatedly strike the battery casing 100 with an audible click-like sound. This sound acts as a reminder to the user of the apparatus that the phonograph mechanism is ready for the next cycle of operation which may be initiated by again depressing switch 60 so that the next portion or track of the record will be played which would correspond to the next succeeding pages of the book.

The device 10 of this invention is further provided with a means 192 for exchanging records 38 and resetting tone arm 64. This means is best shown in FIG. 5 as well as partially being seen in FIGS. 2, 3 and 4. Side wall 32 of lower portion 26 supports an inwardly directed lip 194 with an opening 196 therein. A platform 198 is positioned below lip 194 and mounted on spaced upstanding supports 200 along the interior of wall 32.

Platform 198 has, generally centrally thereof, an upstanding switch knob 202 that projects through opening 196 in lip 194 for moving the platform laterally with respect to the opening. Spaced parallel depending rails 204 on the underside of platform 198 straddle the supports 200 to hold the platform in a lateral path of travel. Spaced, parallel transversely extending ribs 206 and 208 also depend from the underside of platform 198 near the opposite ends thereof. A leaf spring 210 is affixed to a post 212 adjacent rib 206 and is provided with an upwardly bent end 214 intended to extend across the path of travel of rib 206 as the platform 198 is moved laterally with respect to the opening 196. The ribs 206 and 208 provide a means for limiting the lateral movement of the platform in that rib 208 limits leftward movement of the platform 198 and rib 206 limits rightward movement thereof, as best seen in FIG. 5.

The platform 198 is notched at 216 adjacent knob 202 for receiving the upturned end 218 of reset rod 220. A pin 222 extends inwardly from platform 198 and occupies a slot 224 in link 226. Link 226 is pivoted by means of pin 228 between brackets 230 and 232 which are fixed to the bottom 28 of the lower housing 26. The forward end of link 226 is slotted at 234 and receives a pin 236 that extends laterally outwardly from upstanding post 238. Post 238 extends through an opening 240 in the inturned lip 194 and is slidably mounted for vertical movement in a slotted sleeve 242 which upstands from base 28. Through this arrangement, lateral to and fro movement of platform 198 will cause vertical movement of post 238. When the post 238 is in a position of vertical extension it blocks the entry or exit of a record 38 through the slot 44. When the post 238 is moved downwardly it permits the insertion or withdrawal of a record through such an opening.

Reset rod 220 is held against lateral displacement by two tabs 244 and 246 which extend upwardly from base 28. Another tab 248 also projects upwardly from the base 28 near wall 32 to prevent movement of reset rod 220 to and fro with respect to the transverse extent or width of the device 10. At the end opposite the upturned end 218 of reset rod 220, the rod is in abutment with the upstanding wall 34 of base 28.

The intermediate portion of reset rod 220 is offset as at 250. This offset is located so as to lie under pinion 126. As can be seen in FIGS. 3 and 4, when the reset rod 220 has its upturned end 218 moved laterally, this will cause the offset portion 250 to move from occupation in a horizontal plane to a vertical plane. Since this portion 250 underlies the pinion 126, it will cause the pinion to be raised as well as the turntable connected therewith so that the record 38 lying on the turntable and impaled by the pin 124 will be freed from engagement with the pin to permit the record to be moved laterally with respect to the turntable.

The rear end of reset rod 220 has a portion 252 which extends laterally outwardly, a portion 254 which extends upwardly therefrom, and a portion 256 which extends upwardly and in a direction away from portion 252. Portion 256 of reset rod 220 overhangs pin 258 connected to, and extending rearwardly therefrom, end 68 of tone arm 64. When platform 196 is moved to the right as part of the movement in depressing post 238 as well as raising offset portion 250 to raise the turntable, this causes the portion 258 of reset rod 220 to engage the pin 260 that extends rearwardly from the tone arm and depress the same, as shown in FIG. 4, and also to pivot the tone arm 64 about its mounting to position it adjacent the periphery of a record to be placed on the turntable. Thus, when the platform is moved to the left, following the insertion of a record through the slot, the turntable is lowered permitting the record to be impaled by the pin, the post 238 is raised preventing ingress or egress through the slot and the portion 256 of reset rod 220 is moved out of engagement with the pin 258 of the tone arm. The tone arm is then placed with needle adjacent the outer periphery of the record in a position to track on the initial groove portion of the record. Upstanding stops 260 are provided for limiting the insertion of the record so that it will be properly oriented with respect to the turntable pin 124.

Suitable threaded bosses 264 extend upwardly from the base 28 to receive screws that extend downwardly through wells 268 in the top of the housing so that the two housing portions 14 and 26 can be secured together as a unit 12.

This invention provides a means by which a child may simultaneously listen to and visually perceive a story or message or the like. The recorded message is a separate segment corresponding to facing pages of the book so that the "reading" of the book will not be out of phase with the recorded message. The record mechanism is easily advanced to the next incremental cycle of operation by depression of the switch which underlies the book cover. Furthermore, adequate means are provided for preventing the insertion or withdrawal of records during the time that the tone arm needle is in engagement with the record so as to prevent damage to the phonograph mechanism and the phonograph record. Thus, this invention provides a toy which is both entertaining and educational, relatively simple to operate and safe from unintended damage of the components during the use thereof.

The foregoing detailed description has been given for clearness of understanding only, and no unnecessary limitations should be understood therefrom, as some modifications may be obvious to those skilled in the art.

We claim:

1. An audio visual entertainment device of the talking book type, comprising: a housing having a top, bottom and side walls interconnecting said top and bottom; turntable means in the interior of the housing adapted to receive and rotate a phonograph record; phonograph record means constructed and arranged for reception on said turntable means and having message means imparted thereto; sound reproducing means in the housing operably associated with said turntable means for reproducing the message imparted on a phonograph record received and rotated by said turntable means; motor means connected to said turntable means by driving means for driving the same; power means associated with said motor means for powering the same; a book receiving area on the housing top for receiving a book; said book receiving area including a book backbone receiving means generally medially thereof; a book adapted to be received on said book receiving area, said book having written material therein corresponding to the message imparted to said phonograph record, said book including covers connected to a medial backbone, the backbone being constructed and arranged for reception in the backbone receiving means; and switch means on the housing spaced from the backbone receiving means within the area occupied by the covers of an opened book having its backbone strip in the backbone receiving means, said switch means being connected to said power means to cause activation thereof for a limited cycle of operation to move said turntable through a limited increment of displacement, successive cyclic operation of said power and motor means being initiated by successive actuation of said switch means, whereby when a book is in place on the book receiving area the switch means may be operated by pressing on the cover of the book that overlies the switch means.

2. The device of claim 1 wherein the phonograph record means includes message units corresponding to two facing pages of the book, wherein one cycle of operation of the motor means by said switch means drives the turntable means through increments of movement sufficient to reproduce one message unit of the phonograph record means.

3. The device of claim 1 wherein the turntable is mounted in the housing for movement between a phonograph record impaling position wherein a phonograph record may be impaled thereon and a record release position wherein a phonograph record may be laterally moved from or to a position of impalement on the turntable and wherein turntable moving means is connected to said turntable for movement of the turntable between said impaling and release positions, said turntable moving means having an operator member projecting to the exterior of the housing for actuation by a user.

4. The device of claim 3 wherein the turntable moving means include a link having a medial offset portion, the link being mounted for pivotal movement to the interior of the housing responsive to movement of the operator member, said pivotal movement changing the plane of disposition of the offset portion of the link, and wherein said offset portion is in engagement with a portion of the turntable to move the same between said impaling and release positions responsive to pivotal movement of said link.

5. The device of claim 4 wherein said sound reproducing means includes a tone arm mounted in the housing for movement between a starting position wherein the tone arm normally overlies the periphery of a phonograph record on the turntable, and a finished position wherein the tone arm is moved radially inwardly of the periphery of the record, and wherein said turntable moving means includes an interconnected tone arm return means, said tone arm return means being associated with said turntable moving means to move the tone arm of the sound reproducing means to a starting position when the turntable is moved to the release position.

6. The device of claim 5 wherein the tone arm return means includes an offset extension of said link, and a projection of said tone arm in abutment with said offset projection of said link whereby pivotal movement of said link causes swinging movement of said tone arm.

7. The device of claim 1 wherein one of the walls is provided with access means for insertion and withdrawal of phonograph records therethrough and wherein the housing includes blocking means mounted for movement between a blocking position wherein the blocking means prevents insertion and withdrawal of records through the access means and a position removed therefrom, said blocking means being connected to an operating member exteriorly of the housing for manipulation by a user of the device.

8. The device of claim 7 wherein the access comprises an opening in one of the walls of the housing and the blocking means is a post, the blocking position of said post being across said opening to prevent access therethrough.

9. The device of claim 8 wherein the turntable is mounted in the housing for movement between a phonograph record impaling position wherein a phonograph record may be impaled thereon and a record release position wherein a record may be moved laterally from or to a position of impalement on the turntable and wherein said sound reproducing means includes a tone arm mounted in the housing for movement between a starting position wherein the tone arm normally overlies the periphery of a phonograph record on the turntable and a finished position wherein the tone arm is moved radially inwardly of the periphery of the record and wherein means are provided for simultaneously moving the turntable between said impaling and release positions and moving said tone arm from said finished position to said starting position.

10. The device of claim 9 wherein the blocking means is interconnected with the turntable and tone arm moving means for simultaneously movement of the blocking means to the blocking position during movement of the turntable to the impaling position and the movement of the tone arm from the starting position toward the finished position.

11. The device of claim 1 wherein the turntable drive means includes audible signal means associated therewith, said audible signal means having a sound reproducing member in the housing associated with the turntable drive means by means for activating the sound reproducing means near the termination of each cycle of operation.

12. The device of claim 11 wherein the audible signal means includes a hammer member and a striking surface in the interior of the housing adjacent the hammer member.

13. The device of claim 12 wherein the hammer member has a striking end adjacent the striking surface and a free end spaced therefrom and wherein the turntable drive means includes a rotatable arm having a portion positioned to engage the free end of the hammer during rotation thereof, said hammer free end and rotating arm being oriented so as to engage each other near the termination of a cycle of operation of the drive means.

References Cited

UNITED STATES PATENTS

| | | | |
|---|---|---|---|
| 3,086,297 | 4/1963 | Kantrowitz | 35—35 |
| 3,273,804 | 9/1966 | Clawson | 274—9 |

WILLIAM H. GRIEB, Primary Examiner

U.S. Cl. X.R.

274—9